Patented Dec. 8, 1953

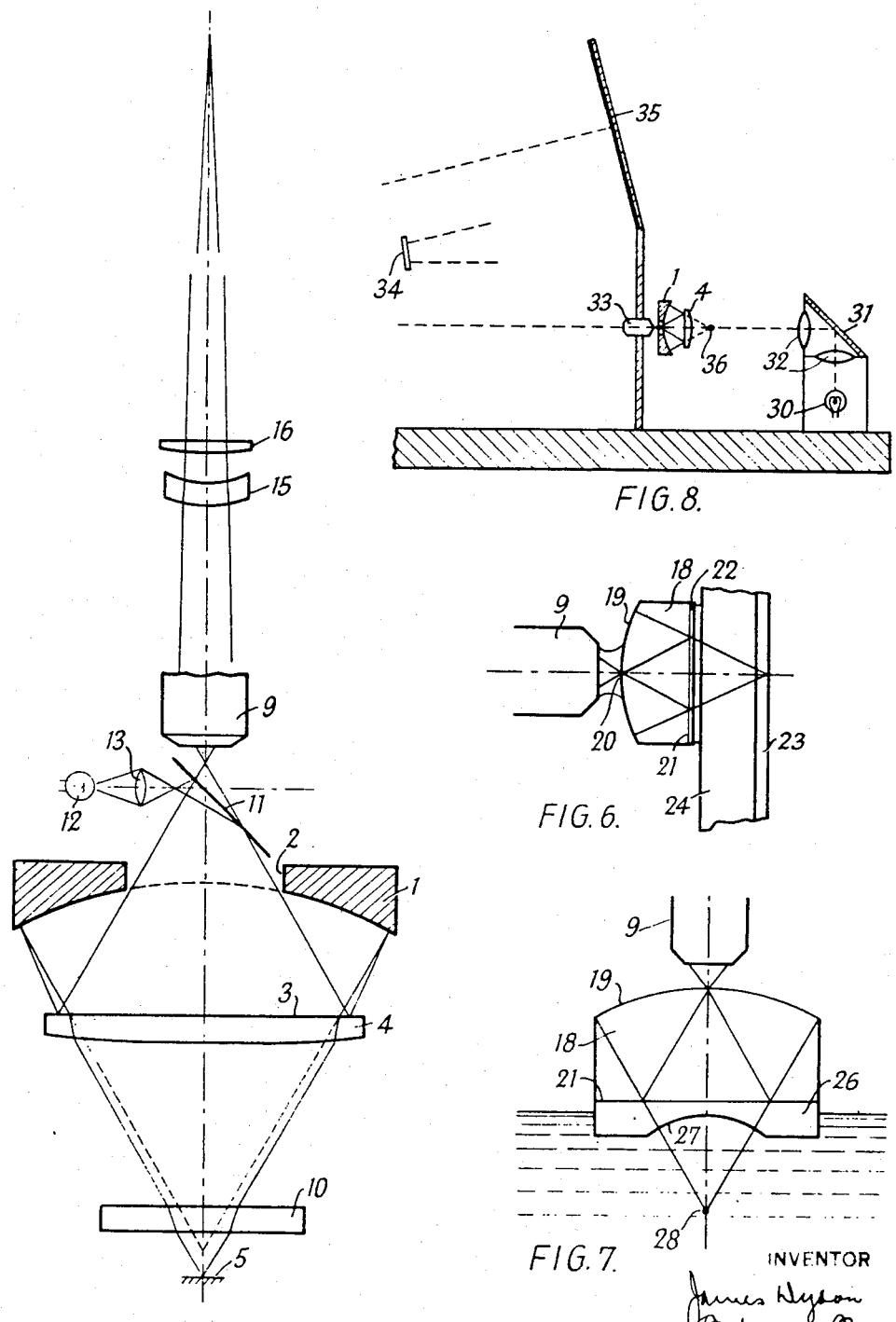

2,661,658

UNITED STATES PATENT OFFICE 2,661,658

OPTICAL SYSTEM FOR INCREASING THE WORKING DISTANCES OF MICROSCOPE OBJECTIVES

James Dyson, Aldermaston, England, assignor to Associated Electrical Industries Limited, a British company Application July 18, 1949, Serial No. 105,430

Claims priority, application Great Britain July 19, 1948

3 Claims. (Cl. 88—39)

In optical apparatus the working distance of an objective, that is the distance between the point at which the object has to be placed and the outer surface of the objective, frequently introduces difficulty particularly when objectives of high magnification are used since circumstances may render it impossible to bring the object within the required distance. For example in some applications of microscopy it may be required to observe an object under high magnification which must be spaced some distance away from the microscope objective. This cannot be done with conventional microscopes, as the working distance of, for example, an 8 mm. objective lens is less than 2 mm. The need for observation under high magnification from a distance arises, for example, in the microscopy of hot objects or of objects in difficult positions such as in the inside of a radio valve. Similar conditions may also obtain in the observation of details in "Nuclear Research" plates, where it is sometimes essential to observe through the glass backing, and in cases where it is desired to use a micromanipulator between the objective and the object as in some biological applications.

A further example of difficulty which occurs by reason of the short working distance of an objective is found in the case of optical projection apparatus, for example a profile projector, when the desire or necessity to use high magnification may impose a limitation on the size and/or shape of the objects to be examined. Other examples of circumstances in which the short working distance of an objective may introduce difficulty will be well known to those skilled in the art.

The present invention has for its principal object the provision of an optical system which, when introduced between an objective and the object to be examined, operates in effect to transfer the required position of the object to a distance which is appreciably greater than that which would be appropriate for the objective in use were the system not introduced therebetween. The optical system of this invention which operates substantially at unit magnification thus enables a long working distance to be obtained even when objectives of high magnification are in use.

A further object of this invention is to provide an optical system for inclusion between an objective and an object, which system comprises a concave mirror formed with a central non-reflecting aperture and a plane reflecting surface positioned between the said mirror and the centre of curvature thereof.

A still further object of the invention is to provide an optical system comprising a concave totally reflecting surface and a plane partially reflecting surface, which surfaces are constituted by opposite faces of a block of transparent material.

Another object of this invention is to provide an optical system which, when used in conjunction with an objective, enables an increased working distance to be obtained and in which means is provided for reducing distortion due to spherical aberration or coma.

Other objects and advantages of the invention will become apparent during the course of the following description of the invention with reference to the accompanying drawings, in which:

Fig. 5 shows a development of the systems of Figs. 1 and 2 as used in conjunction with a microscope;

Figs. 6 and 7 show still further forms of an optical transfer system in accordance with this invention; and Fig. 8 shows an application of an optical system to optical projection apparatus.

Figure 1:
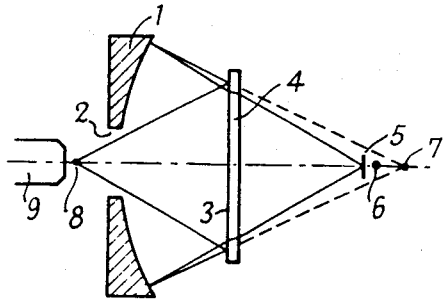
Figs. 1 and 2 show diagrammatically optical systems in accordance with this invention.

Referring to the drawings, the optical system of the present invention there illustrated is characterised in that the system comprises a concave totally reflecting surface, for example a concave mirror, the centre of curvature of which is situated at or near the position to be occupied by an object to be viewed, and a plane reflecting surface which is positioned between the concave surface and the centre of curvature thereof in such manner as to intercept light rays converging to form an image of the object after reflection from the concave surface and to reflect said light rays through an opening in said concave surface to form an image at or behind the boundary thereof.

Conveniently the opening in the concave totally reflecting surface is formed as a central aperture but in some circumstances it may be formed by leaving a small area of the surface unsilvered.

The plane reflecting surface may be formed as an annulus of reflecting material having a clear central portion through which light rays from the object to the concave mirror may pass. Alternatively and in a preferred form, the reflecting surface is formed as a "half-silvered" surface through which light rays from the object to the concave mirror may pass but from which light rays reflected from the mirror will be reflected.

The expressions "silvered" and "half-silvered" as used herein are intended to denote that the surface in question either is substantially totally reflecting for light rays or is partly reflecting and partly transmitting for light rays, and is not to be understood as meaning that the reflecting layer is necessarily formed of the metal silver. Other metals such as aluminium may be used for this purpose as is well known to those skilled in the art.

Referring now to Fig. 1, the optical system there illustrated comprises a spherical concave mirror 1 which is formed with a central aperture 2, and a reflecting surface 3 which is formed as a half-silvered surface on that side of a plane parallel plate 4 which faces the mirror 1. If an object 5 is located on the optical axis of the system at or near the centre of curvature 6 of the mirror 1, an image would be formed at the point 7. However, light rays from the object 5 after reflection from the mirror 1 will be reflected from the half-silvered surface 3 through the aperture 2 in the mirror 1 to form an image at the point 8 in position to be viewed by an objective 9.

Since only the outer periphery of the surface 3 will be used for reflection of the light rays, it is possible to form this surface as an annulus which is totally reflecting surrounding a circular area which is un-silvered so as to transmit light rays from the object to the mirror 1.

The provision of such an optical system between an objective 9 and an object 5 has in effect increased the working distance of the objective from a distance represented as the distance between the facing surface of the objective 9 and the point 8 to a distance represented as the distance between the facing surface of the plane parallel plate 4 and the object 5.

If the object 5 be located exactly at the centre of curvature 6 of the spherical mirror 1, the image formed should be free from spherical aberration and the magnification of the system will be unity. However, the light rays have to pass through the material of the plane parallel plate 4 on their way to the mirror 1, whilst in addition the object 5 may in some applications be enclosed, for example in a vacuum furnace, which would necessitate the use of a substantial window of a transparent material such as glass or silica between the object and the optical system. The result of the interposition of such plane-parallel transparent plates is to introduce spherical aberration which would spoil the definition of the image.

Since the spherical aberration introduced by a plate is of the opposite sense to that introduced by a concave spherical mirror, the object may be located at such a distance from the centre of curvature of the spherical mirror that the spherical aberration thereby introduced annuls, or nearly annuls, the spherical aberration introduced by the passage of the light rays through any transparent plates in their path.

In such a case the distance of the object 5 from the centre of curvature 6 of the spherical mirror 1 should be such that the image would (if the light rays were not intercepted by the half-silvered surface 3) be situated at 7, a distance $kR$ behind the centre of curvature, where $R$ is the radius of curvature of the spherical mirror 1 and $k$ a fraction depending on the total thickness $t$ of plane-parallel transparent plates in the system. Assuming a refractive index of 1.5 for the transparent plates, these quantities are connected by the equation:

$$\frac{5t}{27} = \frac{Rk^2(1+k)^2}{(1+2k)^4}$$

In such an arrangement the magnification will not be unity but $(1+2k)$.

A closer investigation of the aberrations shows that for a particular case suitable values for $k$ would lie in the range $k=0.25$ to $k=0.3$. Thus, as an example, if $t$ is 8 mm. and $k=0.3$, the above equation gives $R=64$ mm. An examination of the residual aberrations discloses that a numerical aperture of about 0.51 can be achieved, allowing of a magnifying power of 500 overall to be used.

Figure 2:
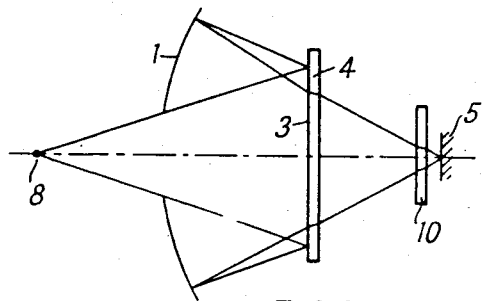

An example of an optical system designed on these lines is shown in Fig. 2. In this arrangement the light rays have to pass not only through the plane parallel plate 4 which is provided with the half-silvered surface 3 but also through a plane parallel plate 10 which may be a protective window. If the thickness of each of plates 4 and 10 be assumed to be 4 mm. and the radius of curvature of the mirror 1 is 64 mm., with the object located 55.5 mm. and the half-silvered surface 3 located 29 mm. from the surface of the mirror 1, an image substantially free from spherical aberration may be formed at 8 at a distance of 25 mm. from the mirror surface and behind the mirror. A convenient diameter for the mirror 1 would be 60 mm.

This arrangement for compensating for spherical aberration tends, however, to introduce a form of aberration known as "coma," which arises because the image is not formed at the centre of curvature of the spherical mirror.

Both forms of aberration may, however, be substantially reduced by shaping that side of the plane parallel plate 4 (Figs. 1 and 2) which is nearer to the object into a convex spherical curve of radius approximately thirty times the distance from this surface to the object. After passing through such a plano-convex plate, light rays then appear to come from a virtual object which, if arranged to be at the centre of curvature of the concave mirror, produces an image, after reflection at the half-silvered surface, which is free from spherical aberration and has only a small amount of coma.

An optical system arranged in this manner would be the same as that shown in Figs. 1 and 2 except that that face of the plane parallel plate 4 facing the object would be formed slightly convex instead of plane. Such an arrangement is also shown in Fig. 5 to be described hereinafter. Suitable dimensions for one particular form of such a system which, however, does not provide such a long working distance as that described with reference to Fig. 1, would be: concave mirror 30 mm. radius of curvature and 30 mm. diameter, plano-convex plate maximum thickness 3 mm., radius of curvature of convex face 465 mm., distance of convex face of plano-convex plate from object 12.8 mm. and from centre of curvature of mirror 12.0 mm.

When an optical system according to the invention is used with a microscope, if an illuminator in the observing microscope lying on the axis of the optical system is used, the light will follow the reverse path through the optical system and illuminate the object. Due to attenuation of the light (such as by a factor of 16) in its two passages through the system, and to reflection losses at the concave mirror and object, the light tends to be swamped by reflection from the near surface of the microscope objective.

Figure 3:
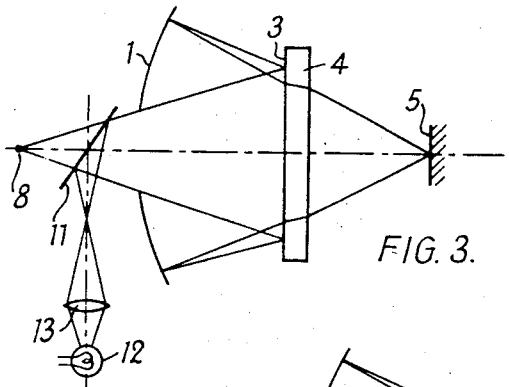
Figs. 3 and 4 show alternative methods of illuminating an object when viewed with the optical systems of Figs. 1 and 2.

This may be avoided by the use of an arrangement as shown in Fig. 3 in which the light rays converging to form the image at 8 after reflection from the half-silvered surface 3 are intercepted by a very thin (or pellicle) half-silvered mirror 11 which is inclined at 45° to the axis, and which reflects into the system a diverging cone of light formed by a lamp 12 and condenser lens 13, the optical axis of lamp and lens being at right angles to the axis of the main optical system. In this way the object may be illuminated in the same manner as it would be if an illuminator in the observing microscope were used but without the resulting light losses. It is desirable to blacken a small spot in the centre of the half-silvered surface 3 to prevent light being reflected directly back into the observing microscope and causing glare. Nothing is lost thereby as the centre of the half-silvered surface cannot be used because of the aperture 2 (Fig. 1) in the concave mirror 1.

Figure 4:
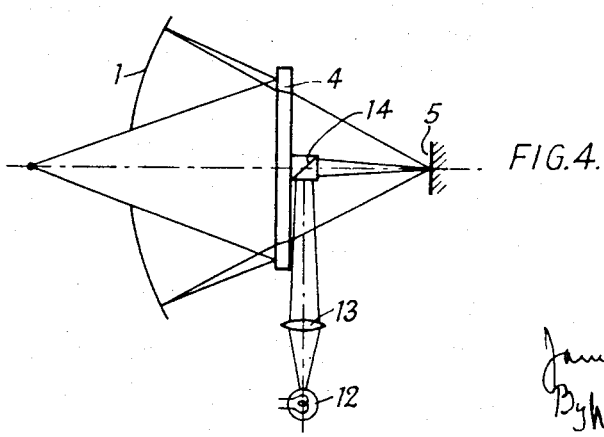

In an alternative arrangement shown in Fig. 4 a small area mirror 14 is fixed, at an angle of 45° to the axis of the optical system, at the centre of that side of the plate 4 nearer the object 5 so as to reflect a beam of light directly on to the object from the lamp 12 and condenser lens 13 whose axis is at right angles to the axis of the main optical system. In such an arrangement any light specularly reflected from the object 5 goes back into the illuminating system and does not enter the microscope, hence "darkground" illumination is obtained.

Fig. 5 illustrates the use of an optical system of this invention as described with reference to Fig. 2 in conjunction with a microscope and an illuminating system of the kind shown in Fig. 3. The form of the optical system shown is that previously described, namely in which the face of the plate 4 facing the object 5 is formed slightly convex. However, the virtual image formed by this lens is arranged not as previously described exactly at the centre of curvature of the mirror 1, but at a distance of say 1.5 mm. therefrom. The light source 12 and condenser lens 13 are arranged so that an image of the source is sharply focused on the object 5. An unwanted image of the source 12, which may be formed by two reflections from the half-silvered surface 3 and one reflection from the concave mirror 1, which would otherwise coincide with the virtual image of the object formed by the plano-convex plate 4 and would therefore tend to obscure it, will accordingly be out of focus by about 3 mm. and appears as a large illuminated disc with a dark patch at the centre due to the aperture 2 in the mirror 1. With suitable dimensions and spacings, the dark patch may be arranged to be so large that it occupies the whole field of the microscope and so the image of the object 5 may be seen unobscured. Suitable dimensions and spacings for a microscope objective of 8 mm. are: mirror 1 radius 58 mm., plano-convex plate 4 maximum thickness 4 mm., radius of convex surface 1150 mm., axial distance of convex surface from object 35.1 mm., axial distance of half-silvered surface 3 from projected surface of mirror 19.5 mm. and thickness of protective window plate 10 4.0 mm.

Because of the 1.5 mm. separation that has been introduced between the centre of curvature of the mirror 1 and the virtual image, the latter is afflicted by slight spherical aberration. It is found that this can be corrected by the use of a meniscus lens 15 both surfaces of which are concentric with the centre of curvature of the mirror 1. If there is no room to introduce this meniscus lens in front of the microscope objective 9, it may be placed behind it and its surfaces will then be formed concentric with the image formed by the objective 9 of the centre of curvature of the mirror 1. To enable the objective 9 lens to work with an equivalent microscope tube af about 160 mm., this meniscus lens is followed by a plano-convex lens 16 of 200 mm. focal length which brings the final image to a reasonable position in the system.

The system just above described with reference to Fig. 5 introduces some chromatic aberration which is not serious if, for example, a mercury vapour lamp is used as the light source and the blue and violet lines cut out therefrom by a pale yellow filter. However, chromatic aberration can be corrected if required by forming the 200 mm. focal length lens 16 into a doublet.

An alternative form of the optical system of the present invention will now be described with reference to Figs. 6 and 7. In this case, instead of forming the concave mirror 1 and reflecting surface 3 on separate bodies of glass or other suitable material as shown with reference to Figs. 1-5, the two surfaces are constituted by opposite faces of a block of transparent material, one face being formed as a convex spherical surface which is fully silvered except for a central opening and the other face being formed as a plane surface which is half silvered.

As shown in Fig. 6 such a composite optical system is constituted by a body 18 of transparent material such as glass of which the left-hand surface 19 facing an objective 9 is formed convex and is fully silvered except for a small area at 20 on the optical axis, and the right-hand surface 21 is formed plane and is half silvered. This half-silvered surface is protected by a thin cover slip 22. Such a system is very convenient for use in special circumstances, for example as shown in the microscopic examination of detail in the emulsion 23 of a photographic plate when observation has to be made through a relatively thick glass backing plate 24. The thickness of the block 18 is preferably such that the image of an object coincides with the surface 19 and by using an immersion liquid between a suitable objective 9 and the surface 19 and also between the cover slip 22 and the glass plate 24, the light path may be made to lie entirely in a medium of uniform refractive index so that there is no spherical aberration. A numerical operation of 0.75 may be readily achieved in such a system with a working distance of about 7 mm. and a block 18 of maximum thickness of about 7.5 mm.

A modification of the arrangement of Fig. 6 which is suitable for "water-immersion" microscopy such as for the examination of aquatic life is shown in Fig. 7. The concave mirror surface 19 and the half-silvered surface 21 are again constituted by opposite faces of a block 18 but there is added in place of the cover slip 22 a transparent member 26, the outer surface of which is worked as shown to a concave spherical form 27 concentric with the spherical mirror surface 19. Light rays from an object 28 fall normally on to the surface 27 and thus no chromatic difference of focus occurs. Chromatic difference of magnification can be avoided by using a glass such as a boro-silicate crown, having its refractive index sensibly proportional to that of water throughout most of the spectrum. A numerical aperture of 0.7 can be achieved.

It will be appreciated that in the forms of optical system described with reference to Figs. 6 and 7 the half-silvered surface may be formed on that side of the cover slip 22 or the transparent member 26, as the case may be, which faces the block 18 instead of on the plane face of the block 18 as described.

The application of the optical system of this invention to a projection syqstem is illustrated in Fig. 8. The profile projector there shown, which is of conventional form, comprises a light source 30, a reflector 31 and condensing lenses 32, an objective 33, a reflector 34 and a screen 35. When an objective giving a magnification of 100 or more times is in use, the working distance is very small and it is sometimes impossible to arrange an object for inspection in the correct position. However, by introducing the optical system of this invention between objective and object a considerable increase in working distance is obtained. As shown, an optical transfer system similar to that of Figs. 1 and 2 and comprising an apertured concave mirror 1 and a plano-convex lens 4 formed with a half-silvered surface on its plane side is positioned between the objective 33 and the object to be inspected 36.

Although for the purpose of explanation the optical system of this invention has been described with reference to its use in conjunction with a microscope and an optical projector, it will be understood that the system may be used for other purposes and that the arrangement and disposition of the parts of the system may be varied without departing from the true scope of the invention as defined in the following claims.

What I claim as new and desire to secure by Letters Patent of the United States is:

1. An optical system for increasing the working distance of a microscope objective, comprising a totally reflecting spherical concave mirror having a central aperture, a transparent plane parallel plate extending normal to the optical axis of the system and a partially reflecting surface extending uniformly on the side of the plane parallel plate which faces the mirror and positioned substantially midway between the spherical concave mirror and its center of curvature whereby complementary object and image positions are formed on an optical axis located adjacent the center of curvature and the rear surface of the concave mirror, and a microscope objective adjacent the rear surface of the concave mirror and in line with the optical axis of said system.

2. An optical system for increasing the working distance of a miscroscope objective, comprising a totally reflecting spherical concave mirror having a central aperture, a transparent plane parallel plate extending normal to the optical axis, a partially reflecting surface extending uniformly on the side of the plate which faces the mirror and is positioned substantially midway between the concave mirror and its center of curvature, whereby for an object located on the optical axis adjacent said center of curvature an image is formed adjacent the rear surface of the mirror, and a microscope objective adjacent said image position.

3. A microscope, an objective to said microscope, and an optical system for increasing the working distance of said microscope objective, said system comprising a totally reflecting concave spherical mirror formed with a central aperture and located with its optical axis coincident with that of the microscope objective and so that the said objective is adjacent the center of the rear surface thereof, a transparent plane parallel plate extending normal to the said optical axis and positioned with the side thereof facing the mirror substantially midway between the concave mirror and its center of curvature, a partial reflecting surface on said side of said plate, and means for locating an object at the center of curvature of said mirror, the system being designed to produce an image of the object at the objective.

JAMES DYSON.

References Cited in the file of this patent
UNITED STATES PATENTS

| Number | Name | Date |
|---|---|---|
| 929,795 | Seidentopf | Aug. 3, 1909 |
| 1,199,307 | Risley | Sept. 26, 1916 |
| 1,840,448 | Heine | Jan. 12, 1932 |
| 1,943,511 | Bauersfeld | Jan. 16, 1934 |
| 2,076,103 | Thorner | Apr. 6, 1937 |
| 2,187,057 | Sauer | Jan. 16, 1940 |
| 2,358,316 | Chwalow | Sept. 19, 1944 |
| 2,378,301 | Kaprelian | June 12, 1945 |
| 2,482,115 | Laird | Sept. 20, 1949 |
| 2,520,634 | Grey | Aug. 29, 1950 |

FOREIGN PATENTS

| Number | Country | Date |
|---|---|---|
| 217,229 | Germany | Dec. 22, 1909 |
| 269,447 | Germany | Jan. 22, 1914 |
| 565,868 | Germany | Dec. 8, 1932 |
| 414,856 | Great Britain | Aug. 16, 1934 |
| 544,694 | Great Britain | Apr. 23, 1942 |
| 884,172 | France | Apr. 12, 1943 |
| 234,156 | Switzerland | Dec. 16, 1944 |